(12) United States Patent
Combes et al.

(10) Patent No.: US 8,329,782 B2
(45) Date of Patent: Dec. 11, 2012

(54) REMOVING FLUOROSURFACTANT FROM AQUEOUS FLUOROPOLYMER DISPERSIONS USING ANION EXCHANGE POLYMER WITH FUNCTIONAL GROUPS RESISTANT TO DEGRADATION TO TRIALKYLAMINES

(75) Inventors: James R. Combes, Longmont, CO (US); David William Johnson, Washington, WV (US); Stephen Thomas Breske, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 318 days.

(21) Appl. No.: 12/641,423

(22) Filed: Dec. 18, 2009

(65) Prior Publication Data

US 2010/0093893 A1    Apr. 15, 2010

Related U.S. Application Data

(62) Division of application No. 11/292,454, filed on Dec. 2, 2005, now Pat. No. 7,666,927.

(60) Provisional application No. 60/638,329, filed on Dec. 22, 2004.

(51) Int. Cl.
*C08L 1/00* (2006.01)

(52) U.S. Cl. ........ 523/310; 523/332; 524/458; 524/482; 524/544; 524/545

(58) Field of Classification Search .................. 523/310, 523/332; 524/458, 482, 544, 545
See application file for complete search history.

(56) References Cited

U.S. PATENT DOCUMENTS

| 2,559,752 | A | | 7/1951 | Berry |
| 3,037,952 | A | | 6/1962 | Jordan, Jr. et al. |
| 3,704,272 | A | | 11/1972 | Holmes |
| 3,882,153 | A | | 5/1975 | Seki et al. |
| 4,282,162 | A | | 8/1981 | Kuhls |
| 4,369,266 | A | | 1/1983 | Kuhls et al. |
| 5,569,365 | A | * | 10/1996 | Rabin et al. .................. 204/450 |
| 5,597,481 | A | * | 1/1997 | Stillian et al. .............. 210/198.2 |
| 6,153,688 | A | | 11/2000 | Miura et al. |
| 6,436,244 | B1 | | 8/2002 | Fuhrer et al. |
| 6,642,415 | B1 | | 11/2003 | Fuhrer et al. |
| 6,720,437 | B2 | * | 4/2004 | Jones et al. ................... 554/191 |
| 6,825,250 | B2 | * | 11/2004 | Epsch et al. .................. 523/310 |
| 6,833,403 | B1 | * | 12/2004 | Bladel et al. .................. 524/458 |
| 6,861,466 | B2 | | 3/2005 | Dadalas et al. |
| 7,504,036 | B2 | * | 3/2009 | Gottlieb et al. ............... 210/688 |
| 2003/0125421 | A1 | | 7/2003 | Bladel et al. |
| 2004/0143052 | A1 | | 7/2004 | Epsch et al. |
| 2004/0186219 | A1 | | 9/2004 | Dadalas et al. |
| 2005/0070633 | A1 | * | 3/2005 | Epsch et al. .................. 523/310 |
| 2006/0036021 | A1 | * | 2/2006 | Noelke et al. ................. 524/544 |

FOREIGN PATENT DOCUMENTS

| EP | 1155055 B1 | | 4/2003 |
| WO | 0035971 | | 6/2000 |
| WO | WO 00/35971 | * | 6/2000 |
| WO | 2006020721 A1 | | 2/2006 |
| WO | WO-2006/069104 A1 | * | 6/2006 |

OTHER PUBLICATIONS

Ion Exchange Chromatography: Principles and Methods. Pharmacia LKB Biotechnology, pp. 6-47, Apr. 1991.*

* cited by examiner

*Primary Examiner* — Peter D. Mulcahy
*Assistant Examiner* — Henry Hu

(57) ABSTRACT

A process for reducing fluorosurfactant content of a stabilized fluorosurfactant-containing aqueous fluoropolymer dispersion comprising contacting the stabilized fluorosurfactant-containing aqueous fluoropolymer dispersion with an anion exchange resin comprising a polymer and quaternary ammonium functional groups to reduce fluorosurfactant content, the functional groups being resistant to degradation which releases trialkylamines. The anion exchange resin is separated from the dispersion after the fluorosurfactant content has been reduced.

9 Claims, No Drawings

REMOVING FLUOROSURFACTANT FROM AQUEOUS FLUOROPOLYMER DISPERSIONS USING ANION EXCHANGE POLYMER WITH FUNCTIONAL GROUPS RESISTANT TO DEGRADATION TO TRIALKYLAMINES

FIELD OF THE INVENTION

This invention relates to processes for removing fluorosurfactant from aqueous fluoropolymer dispersions.

BACKGROUND OF THE INVENTION

Fluorosurfactants are typically used as a polymerization aid in the dispersion polymerization of fluoropolymers, the fluorosurfactants functioning as a non-telogenic dispersing agent. For example, an early description of this use of fluorosurfactants is found in U.S. Pat. No. 2,559,752 (Berry). Because of environmental concerns and because fluorosurfactants are expensive, processes have been developed for their recovery from waste water and from aqueous fluoropolymer dispersions.

One method for removal of fluorosurfactants from fluoropolymer dispersions is disclosed in U.S. Pat. No. 4,369,266 and includes the addition of a stabilizing surfactant followed by concentration by ultrafiltration. This patent teaches that a high proportion of the fluorosurfactant can be removed via the aqueous permeate. It is also known to remove fluorosurfactant by adsorption onto an ion exchange resin as taught in U.S. Pat. No. 3,882,153 (Seki et al) and U.S. Pat. No. 4,282,162 (Kuhls). Kuhls teaches recovery of fluorinated emulsifiers dissolved in the aqueous phase after coagulation of the polymer from the dispersion or in aqueous polymer dispersions to be concentrated. US 2003/0125421 A1 (Bladel et al.) also teaches removal of fluorine-containing emulsifiers from fluoropolymer dispersion by contacting with an anion exchanger.

Known processes using anion exchange resins for the removal of fluorosurfactant from fluoropolymer dispersions employ either strongly basic anion exchange resins or weakly basic anion exchange resins. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media.

Strongly basic resins disclosed for use of the removal of fluorosurfactant from dispersion employ a styrene-divinyl benzene polymer matrix with trimethyl amine groups on benzyl groups of the matrix polymer, i.e., providing quaternary ammonium functionality. For example, Bladel et al. teaches to the use of a resin sold by Rohm and Haas under the trademark AMBERLITE® 402 which contains trimethyl amine moieties in the anion exchange groups. Use of anion exchange resins of this type are prone to the release of trimethylamine in very small quantities into the dispersion. This is due to residual trimethyl amine in the resin and the gradual degradation of the ion exchange groups, which degradation is accelerated by higher dispersion treatment temperatures. Trialkyl amines such as trimethylamine, has a strong odor even in minute quantities (odor threshold of 5 ppb) which can be objectionable when the dispersion is processed.

BRIEF SUMMARY OF THE INVENTION

The invention provides a process for reducing fluorosurfactant content of a stabilized fluorosurfactant-containing aqueous fluoropolymer dispersion comprising contacting the stabilized fluorosurfactant-containing aqueous fluoropolymer dispersion with an anion exchange resin comprising a polymer and quaternary ammonium functional groups, the functional groups being resistant to degradation which releases trialkylamines.

In accordance with a preferred embodiment of the invention, a process is provided for reducing fluorosurfactant content of a stabilized fluorosurfactant-containing aqueous fluoropolymer dispersion which comprises contacting the stabilized fluorosurfactant-containing aqueous fluoropolymer dispersion with an anion exchange resin comprising a polymer and functional groups, the functional groups comprising quaternary ammonium groups comprising a dimethyl hydroxyalkyl amine moiety. The anion exchange resin is separated from the dispersion after the fluorosurfactant content has been reduced.

In accordance with a another preferred embodiment of the invention, a process is provided for reducing fluorosurfactant content of a stabilized fluorosurfactant-containing aqueous fluoropolymer dispersion which comprises contacting the stabilized fluorosurfactant-containing aqueous fluoropolymer dispersion with an anion exchange resin comprising a polymer and functional groups. The quaternary ammonium functional groups are linked to the polymer by a C2 to C6 alkyl group. The anion exchange resin is separated from the dispersion after the fluorosurfactant content has been reduced.

The dispersions resulting from the process of the invention do not give off the strong amine odor which can occur when using those anion exchange resins which are prone to degrade and release trimethylamine.

DETAILED DESCRIPTION OF THE INVENTION

Fluoropolymer Dispersion

The stabilized fluorosurfactant-containing aqueous fluoropolymer dispersion for treatment in accordance with the present invention is made by dispersion polymerization (also known as emulsion polymerization). The aqueous fluoropolymer dispersion is a stabilized fluorosurfactant-containing aqueous fluoropolymer dispersion which means that it contains sufficient nonionic surfactant to prevent coagulation of the dispersion when the fluorosurfactant content is reduced. As will be explained in more detail hereinafter, depending upon when the process of the invention is employed, the nonionic surfactant may already be present or may be added for stabilization prior to treatment according to the invention. After concentration, aqueous fluoropolymer dispersions are useful in coating or impregnating compositions and to make cast films.

Fluoropolymer dispersions are comprised of particles of polymers made from monomers wherein at least one of the monomers contains fluorine. The fluoropolymer of the particles of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion is polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1\times10^9$ Pa·s. Such high melt viscosity indicates that the PTFE does not flow in the molten state and therefore is not melt-processible. PTFE and modified PTFE are frequently sold in dispersion form and transported in shipping containers and the process of the invention can be readily employed for reducing the fluorosurfactant content of such dispersions.

The fluoropolymer component of the dispersion may be melt-processible. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride (PVDF) and copolymers of vinylidene fluoride as well as polyvinyl fluoride (PVF) and copolymers of vinyl fluoride.

A typical process for the aqueous dispersion polymerization of preferred polymer PTFE is a process wherein TFE vapor is fed to a heated reactor containing fluorosurfactants, paraffin wax and deionized water. A chain transfer agent may also be added if it desired to reduce the molecular weight of the PTFE resin. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and polymer dispersion is transferred to a dispersion concentration operation which produces stabilized dispersions which are useful for the practice of the present invention. In the dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % to about 60 wt %. Miura et al., U.S. Pat. No. 6,153,688 discloses a similar process. Aromatic alcohol ethoxylates can be used as the nonionic surfactant but, because there is concern about possible environmental harm from aromatic compounds, preferred nonionic surfactants are aliphatic alcohol ethoxylates. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc.

Especially preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18.

Concentrated dispersions containing nonionic surfactant made as described above thus are stabilized fluorosurfactant-containing dispersions suitable for use in the practice of the present invention.

The dispersion polymerization of melt-processible TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation performed with the aid of a nonionic surfactant as used for PTFE dispersions can be used for TFE copolymer dispersions.

Stabilized fluorosurfactant-containing dispersions suitable for use in the practice of the present invention can be made prior to concentration by adding nonionic surfactants to raw dispersion (after wax removal referred to above). It is desirable to use the same nonionic surfactants that will be used for concentration and nonionic surfactants for this purpose are described above. Nonionic surfactant is typically added to the raw dispersion under mild agitation conditions in the approximately the same concentrations as is used for concentration, about 1 to about 6 wt % based on the weight of the dispersion.

Stabilized fluorosurfactant-containing fluoropolymer dispersions with solids content of about 15 to about 70 wt %, preferably about 25 to about 65 wt %, are advantageously treated by the present invention.

Fluorosurfactants

The fluorosurfactant in the fluorosurfactant-containing dispersions to be reduced in this process is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Anion Exchange Resins

The anion exchange resins for use in accordance with the present invention have a polymer and quaternary ammonium groups which are resistant to degradation which releases trialkylamines. In known processes using resins with quaternary ammonium groups with a trimethylamine moiety, residual trimethylamine can be washed from the resin but additional trimethylamine will be produced by degradation, especially at the higher temperatures which are desirable to promote rapid ion exchange and decrease viscosity as is desirable for the treatment of aqueous fluoropolymer dispersions.

In one embodiment of the invention, the quaternary ammonium groups comprise dimethyl hydroxyalkyl amine moieties. Preferably, the alkyl group of the dimethyl hydroxyalkyl amine moieties has 1-4 carbon atoms. A particularly suitable resin has functional groups comprising a dimethyl ethanol amine moiety.

The polymer of the anion exchange resin preferably comprises a styrene-divinylbenzene copolymer. Preferably, in this embodiment of the invention in which the functional groups comprising the a dimethyl hydroxyalkyl amine group, the dimethyl hydroxyalkyl amine group is on a benzyl group of the styrene divinylbenzene copolymer to provide the quaternary ammonium functionality.

Macroporous and gel form anion exchange resins can be employed.

Anion exchange resins of the type described above are commercially available from Rohm and Haas under the trademark AMBERLITE® 410 and from Dow Chemical under the trademark DOWEX® MARATHON A2 and DOWEX® UPCORE Mono A2. Commercially available resins of this type are normally available in chloride ion form but other ion forms can be used, e.g., hydroxide, sulfate, and nitrate. Preferably, the resin used in the process in accordance with the invention is in the hydroxyl counter ion form to prevent the introduction of additional anions and to increase pH during anion exchange because a high pH, i.e., greater than 9, is desirable in the product prior to shipping to inhibit bacterial growth.

In accordance with another embodiment of the invention, quaternary ammonium groups are linked to the polymer by a C2 to C6 alkyl group, more preferably an n-butyl group. In this embodiment of the invention, the quaternary ammonium groups can contain a trimethylamine moiety. The polymer is preferably a styrene-divinylbenzene copolymer. More preferably, the C2 to C6 alkyl group is linked to a benzene ring of the polymer. The C2 to C6 group between the polymer and the quaternary amine creates resistance to degradation of the resin.

Anion exchange polymers of the type described above with quaternary amine groups having a trimethyl amine moiety linked to a benzene ring of styrene-divinyl benzene polymer though an n-butyl group are commercially available as Itochu TSA 1200 resin.

Anion exchange resin preferably used in the process of the present invention is monodisperse. More preferably, the anion exchange resin beads have a number average size distribution in which 95% of the beads have a diameter within plus or minus 100 μm of the number average bead diameter.

The monodisperse anion exchange resin has a particle size which provides a suitable pressure drop through the bed. Very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Process

The present invention permits reducing the fluorosurfactant content of a fluorosurfactant-containing dispersion to a predetermined level, preferably a level no greater than about 300 ppm, more preferably a predetermined level no greater than about 100 ppm, especially a predetermined level no greater than about 50 ppm.

Contacting of the anion exchange resin with the dispersion can occur before or after concentration but typically the lower solids material before concentration is easier to process, especially when a fixed bed is employed for carrying out the contacting step. If the process is carried out prior to concentration, nonionic surfactants are added prior to contact with the anion exchange resin as discussed above.

Any of a variety of techniques which bring the dispersion in contact with the anion exchange resin can be used to carrying out ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate. Upper treatment temperature will vary with the type of polymer employed. Typically, temperatures will be between 20° C. and 80° C. Preferably, the temperature is between about 45° C. and 65° C., more preferably between about 50° C. and 60° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

What is claimed is:

1. A process for reducing fluorosurfactant content of a stabilized fluorosurfactant-containing aqueous fluoropolymer dispersion comprising:

contacting said stabilized fluorosurfactant-containing aqueous fluoropolymer dispersion with an anion exchange resin comprising a polymer having covalently linked functional groups to reduce fluorosurfactant content, said functional groups comprising quaternary ammonium groups consisting essentially of a dimethyl hydroxyalkyl amine moiety; and separating said resin from said dispersion after the fluorosurfactant content has been reduced.

2. The process of claim 1 wherein the alkyl group of said dimethyl hydroxyalkyl amine moiety has 1-4 carbon atoms.

3. The process of claim 1 wherein said dimethyl hydroxyalkyl moiety comprises dimethyl ethanol amine.

4. The process of claim 1 wherein said polymer of said anion exchange resin comprises a styrene-divinylbenzene copolymer.

5. The process of claim 1 wherein said contacting of said stabilized fluorosuilactant-containing aqueous fluoropolyrner dispersion with anion exchange resin reduces fluorosurfactant content to no greater than 300 ppm.

6. The process of claim 1 wherein said contacting of said stabilized fluorosurfactant-containing aqueous fluoropolymer dispersion with anion exchange resin reduces fluorosurfactant content to no greater than 100 ppm.

7. The process of claim 1 wherein said contacting of said stabilized fluorosurfactant-containing aqueous fluoropolymer dispersion with anion exchange resin reduces fluorosurfactant content to no greater than 50 ppm.

8. The process of claim 1 wherein said contacting of said dispersion with said anion exchange resin is performed at a temperature between about 45° C. and about 65° C.

9. The process of Tim 1 wherein said contacting of said dispersion with said ion exchange resin is carried out in a fixed bed or in a stirred tank containing slurry of dispersion and anion exchange resin.

* * * * *